(12) United States Patent
Nowak et al.

(10) Patent No.: US 7,297,410 B2
(45) Date of Patent: Nov. 20, 2007

(54) HIGH STRENGTH REAM WRAP

(75) Inventors: Michael R. Nowak, Hilbert, WI (US); LouAnn S. Mueller, Little Chute, WI (US); William R. Arndt, Hilbert, WI (US)

(73) Assignee: Coating Excellence International LLC, Wrightstown, WI (US)

( * ) Notice: Subject to any disclaimer, the term of this patent is extended or adjusted under 35 U.S.C. 154(b) by 0 days.

(21) Appl. No.: 10/023,500

(22) Filed: Dec. 17, 2001

(65) Prior Publication Data

US 2003/0113567 A1 Jun. 19, 2003

(51) Int. Cl.
*B32B 27/10* (2006.01)
*B32B 27/32* (2006.01)

(52) U.S. Cl. ................................ 428/513; 428/512

(58) Field of Classification Search ............. 428/34.2, 428/507, 511, 512, 513, 537.5
See application file for complete search history.

(56) References Cited

U.S. PATENT DOCUMENTS

| | | | |
|---|---|---|---|
| 3,230,135 A | 1/1966 | Hurst | |
| 4,020,215 A | 4/1977 | Michaylov | 156/244 |
| 4,935,298 A * | 6/1990 | Dethlefs et al. | 428/323 |
| 5,196,269 A * | 3/1993 | Kittrell et al. | 428/513 |
| 5,250,348 A | 10/1993 | Knauf | 428/211 |
| 5,922,441 A * | 7/1999 | Eichbauer | 428/213 |
| 5,989,724 A | 11/1999 | Wittosch et al. | 428/511 |
| 6,586,026 B1 * | 7/2003 | Ramesh et al. | 426/127 |

* cited by examiner

*Primary Examiner*—D. S Nakarani
(74) *Attorney, Agent, or Firm*—Duane Morris LLP

(57) ABSTRACT

A new high strength poly one-side ream wrapper made by utilizing copolymer and/or terpolymer resins.

1 Claim, 10 Drawing Sheets

HIGH STRENGTH REAM WRAP

FIELD OF THE INVENTION

The present invention relates to a high strength poly one-side ream wrapper.

BACKGROUND OF THE INVENTION

Ream wrap is the wrapper around the packages of cut size (8½×11 etc.) paper that is used for printers, copy machines, etc. This wrapper has traditionally been paper (poly coated or two papers laminated with poly), plastic film, or a paper/solid plastic film combination.

U.S. Pat. No. 5,250,348 relates to an improved wrapper paper for use in very low contact pressure applications. A wrapper paper for pressure sensitive products bearing on one of its flat surfaces a layer of polyethylene and on the opposite of its flat surfaces a layer of a primer selected from the polyalkyleneimine class, at least portions of the opposite flat coated surfaces facing one another in overlapping relationship when the paper is wrapped about a product, the overlying areas of the wrapper paper being sealed to one another by heat means and the application of very low pressure to the overlapping portions. The invention relates to wrapper papers for pressure sensitive products, such as paper employed in the wrapping for storage and shipping of ream quantities of carbonless printing papers.

U.S. Pat. No. 5,989,724 relates to a recyclable and repulpable ream wrap and related methods of manufacture. Recyclable and repulpable coated paper stock, preferably for use as ream wrap, comprising a substrate coated on at least one surface with a base coat and at least one additional coat over a base coat. Both coats are water based dispersions of a polymer selected from the group consisting of acrylic polymers, acrylic copolymers, polyvinyl acetate, polyvinyl alcohol, ethylene-vinyl acetate, polyvinyl chloride, styrene butadiene copolymers, polyvinylidiene chloride and its copolymers, or starch. The wax free coating forms a pin-hole free continuous film on the substrate which is resident to water and water vapor. The invention also includes processes for making and recycling the coated stocks. The invention concerns coated paper stocks, preferably for use as ream wraps, comprised of a substrate coated on at least one surface with a base coat and at least one additional coat over said base coat both of which are applied as wax free water based polymeric dispersions.

U.S. Pat. No. 4,020,215 relates to an extrusion of polyolefin onto paper at decreased temperatures. By coating a paper substrate first with a polyalkyleneimine and then with a polymer containing groups which react chemically with the imino groups of the polyalkyleneimine, a polyolefin can be extruded onto the substrate with good adhesion at temperatures lower than the temperature that would be required to obtain the same degree of adhesion if the polymer containing the reactive groups were not present.

U.S. Pat. No. 3,230,135 relates to a process for coating paper using a polyimine precoat and products thereof. The invention relates to a method of coating paper materials with a thin polymer film, and to the polymer coated product. The invention relates to depositing of an organic polyimine which has the basic chain structure of a polyethyleneimine, interposed between a substrate and a heat-sealed polymer coating thereon, particularly a polyethylene coating, which improves adhesion and heat seal strength.

As small offices and home offices have proliferated the distribution of reams of paper has changed from boxes to large users, to retail stores and mail order for the small office/home office segments. This has placed increasing demands on the wrapper because of the increased and rougher handling of the individual reams. The result has been more reams breaking open which breaks the moisture barrier, allowing the sheets of wrapped paper to absorb moisture, get minor curl, and jam in the printer or copy machine. As a result the market needs a stronger ream wrapper. Machine direction and cross direction tear strength properties are a measure of the overall strength of the wrapper and its ability to resist breaking open.

One such ream wrap product is a poly one-side ream wrap. The poly one-side ream wrap is a sheet of paper with a low density polyethylene coating on one side. A typical paper used in this application is produced by Canfor in a 50 pound (per 3,000 sq feet) basis weight. Persons making ream wrap would put low-density polyethylene resin on the product in various weights (7 to 14 pounds of polyethylene per 3,000 sq. feet of product is a typical poly coating amount). The low-density polyethylene used is a resin produced with ethylene. Below is representative strength data for 10 pounds of low density monomer coated on paper. As shown below, this coating has increased the tear strength of the product only slightly versus plain paper utilizing paper industry strength tests (Standard TAPPI tests).

|  | Machine Direction Tear | Cross Direction Tear |
| --- | --- | --- |
| 50# Canfor Paper | 122 | 137 |
| 50# Canfor Paper with 10# Polyethylene monomer | 124 | 141 |
| Strength Gain | 2 | 4 |

MD Tear test-TAPPI T-414-units grams of force
CD Tear test-TAPPI T-414-units grams of force

SUMMARY OF THE INVENTION

The present invention relates to a new high strength poly one-side ream wrapper. The product is made by utilizing copolymer and/or terpolymer resins. The copolymer and terpolymer resins are made by combining butene, hexene, and/or octene with ethylene in the feed stocks being used to make the resin. It is an object of the present invention for the product to be produced by applying the copolymer or terpolymer to the paper surface or by blending the copolymer and/or terpolymer resins with low density polyethylene or polypropylene monomer resins before applying it to the paper surface. It is an object of the invention to produce the product of the present invention by co-extruding the low density polyethylene resin (monomer utilizing ethylene feed stock) with copolymer or terpolymer resins.

The present invention relates to a high strength poly one-side ream wrapper comprising paper and copolymer and/or terpolymer resins. The copolymer and/or terpolymer resins comprise butene, hexene, and/or octene with ethylene in feed stocks. The copolymer and/or terpolymer resins are applied to a surface of the paper. It is an object of the present invention for the paper to be additionally coated with low density polyethylene or polypropylene monomer resins. It is an object of the present invention for the low density polyethylene or polypropylene resin to be a monomer utilizing ethylene feed stock.

The present invention relates to a method for producing a high strength poly one side ream wrapper comprising;

co-extruding a low density polyethylene resin with copolymer or terpolymer resins onto a paper surface.

The present invention relates to a method for producing a high strength poly one side ream wrapper comprising; feeding a copolymer and/or terpolymer into an extruder die creating an extrudate and then coating a paper surface with said extrudate between a backing roll and a chill roll. This forms a poly coated paper with the copolymer and/or terpolymer coating.

The present invention relates to a method for producing a high strength poly one side ream wrapper comprising; blending a low-density monomer polyethylene resin with a copolymer and/or terpolymer resin and feeding the mixture into an extruder die creating an extrudate. The extrudate is applied to a paper surface between a backing roll and a chill roll creating a poly coated paper with polyethylene monomer and copolymer or terpolymer blended into the monomer.

The present invention relates to a method for producing a high strength poly one side ream wrapper comprising; coextruding a copolymer and/or terpolymer with a polyethylene monomer layer by feeding the copolymer and/or terpolymer layer and the polyethylene monomer layer through a coextruder die forming a coextrudate. The copolymer and/or terpolymer layer can be blended with a polyethylene monomer. The coextrudate is applied to a surface of a paper wherein the copolymer and/or terpolymer layer face the paper surface, the co-extrudate being applied to the paper surface between a backing roll and a chill roll; creating a poly coated paper having one layer of copolymer or terpolymer and one layer of polyethylene monomer.

The present invention relates to a high strength poly one side ream wrapper comprising; a co-extruded poly coated paper having one layer of copolymer and/or terpolymer on top of the paper and one layer of polyethylene monomer on top of the copolymer or terpolymer layer. The copolymer and/or terpolymer layer can also contain polyethylene monomer.

The present invention further relates to a method for producing a high strength poly one side ream wrapper comprising; coextruding a copolymer and/or terpolymer layer with a polyethylene monomer layer by feeding the copolymer and/or terpolymer layer and the polyethylene monomer layer through a coextruder die to form a coextrudate. The copolymer and/or terpolymer layer can be blended with a polyethylene monomer The coextrudate is applied to a paper surface with the polyethylene monomer facing the paper; the coextrudate applied to the paper surface between a backing roll and a chill roll. This creates a poly coated paper with one layer of copolymer or terpolymer and one layer of polyethylene monomer.

The present invention relates to a high strength poly one side ream wrapper comprising; a co-extruded poly coated paper having one layer of polyethylene monomer on top of a paper layer and a layer of copolymer or terpolymer on top of the polyethylene monomer layer. The copolymer and/or terpolymer layer can be blended with polyethylene monomer.

The present invention relates to a method for producing a high strength poly one side ream wrapper comprising; coextruding a layer of copolymer and/or terpolymer and a layer of polyethylene monomer on each side of the copolymer and/or terpolymer layer by feeding the copolymer and/or terpolymer layer and the polyethylene monomer layers through a coextruder die forming a coextrudate. The copolymer and/or terpolymer layer can also contain polyethylene monomer. The coextrudate is applied to a paper surface so that one of the polyethylene monomer layers faces the paper by running the coextrudate and the paper between a backing roll and a chill roll. This creates a poly coated paper with one layer of copolymer or terpolymer between two layers of polyethylene monomer.

The present invention relates to a high strength poly one side ream wrapper comprising; a poly coated paper having one layer of polyethylene monomer on top of a paper layer followed by a layer of copolymer or terpolymer having on top of it a layer of polyethylene monomer. The copolymer and/or terpolymer layer can also contain polyethylene monomer.

DETAILED DESCRIPTION OF THE INVENTION

In an embodiment of the present invention, the low density polyethylene resin is a monomer utilizing ethylene feed stock. The copolymer and terpolymer resins are made by combining butene, hexene and/or octene feedstock with ethylene feedstock.

Figure 1:
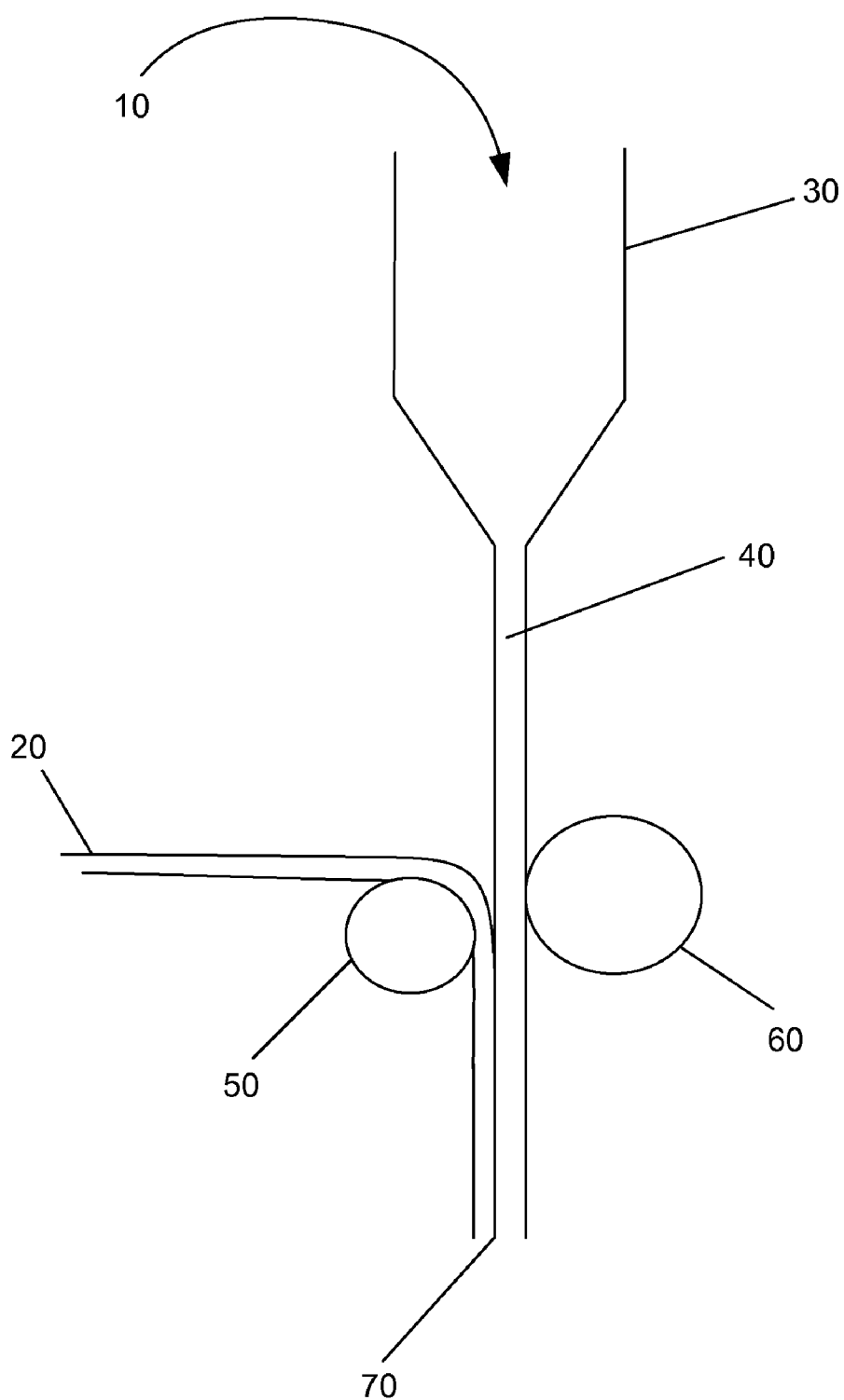
FIG. 1 illustrates a process for forming a poly coated paper with a copolymer and/or terpolymer coating.

In one embodiment shown in FIG. 1, the copolymer and terpolymer resins are applied to the paper surface. The copolymer and/or terpolymer 10 are fed into an extruder die 30 where it becomes extrudate 40. The extrudate 40 is coated on the paper 20 between the backing roll 50 and the chill roll 60 to form a poly coated paper with copolymer and/or terpolymer coating 70.

Figure 2:
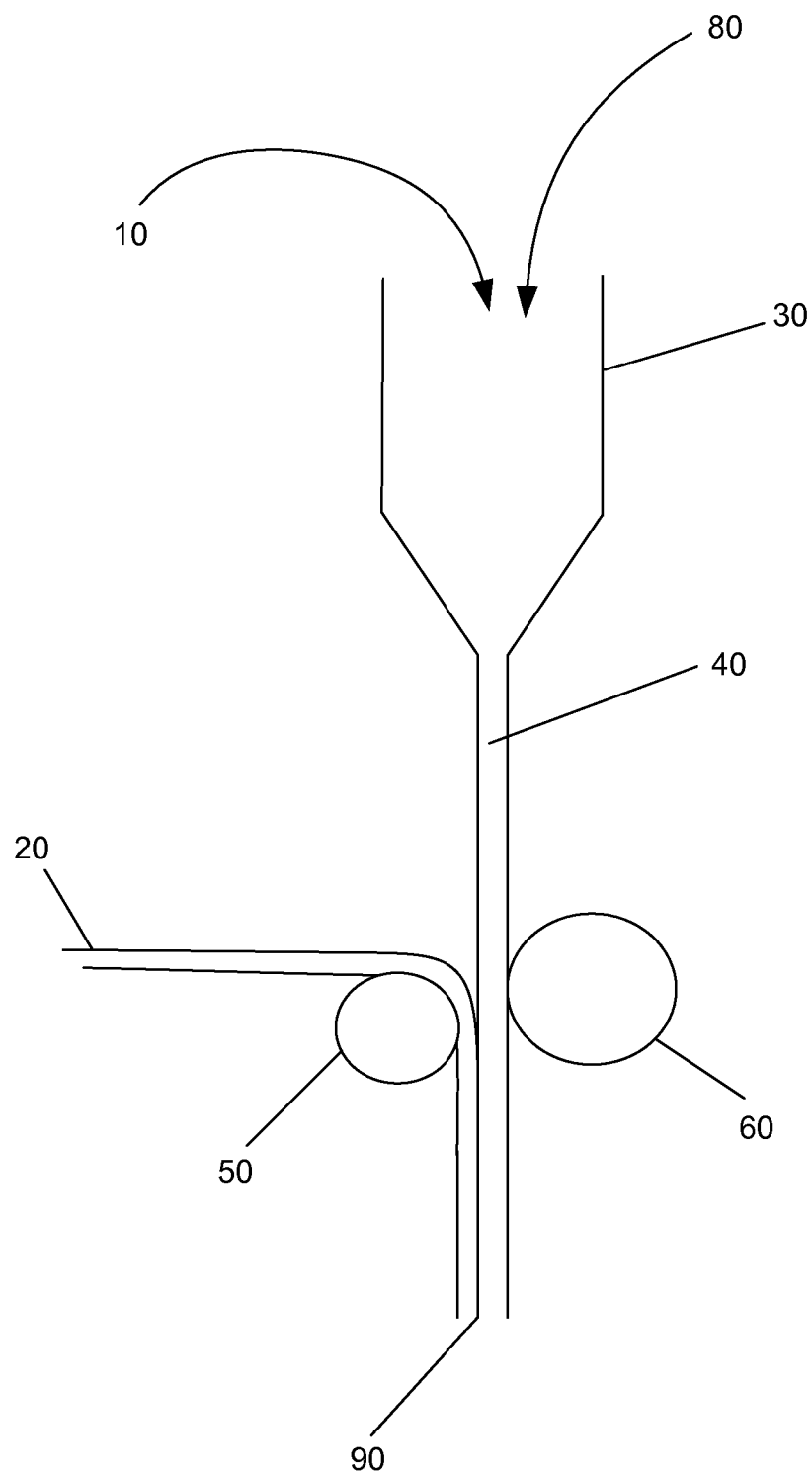
FIG. 2 illustrates a process for forming a poly coated paper with polyethylene monomer and copolymer and/or terpolymer blended into the monomer.

In a further embodiment shown in FIG. 2, low-density monomer polyethylene resin 80 is mixed with copolymer and/or terpolymer resins 10 before or as being fed into an extruder die 30. The low-density polyethylene monomer and copolymer and/or terpolymer resin becomes extrudate 40. The extrudate 40 is applied to the paper surface 20 between the backing roll 50 and the chill roll 60. This creates a poly coated paper with polyethylene monomer and copolymer or terpolymer blended into the monomer 90.

Figure 3:
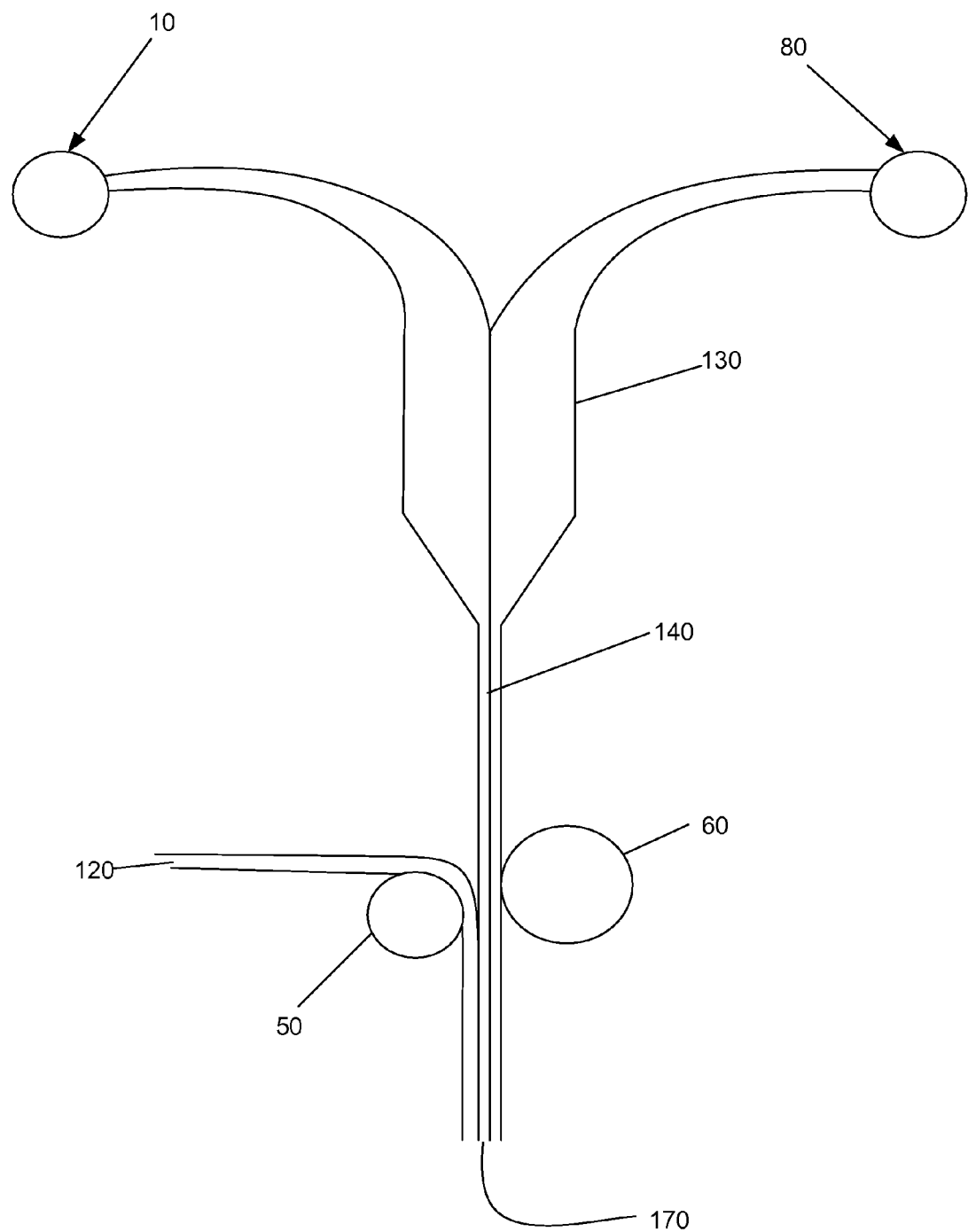
FIG. 3 illustrates a process for forming a coextruded poly coated paper with one layer of copolymer or terpolymer and one layer of polyethylene monomer.

In a further embodiment, shown in FIG. 3, the copolymer and/or terpolymer layer 10 which may be blended with polyethylene monomer, is coextruded with a polyethylene monomer layer 80. The copolymer and/or terpolymer layer 10 and the polyethylene monomer layer 80 are fed through a coextruder die 130 to form coextrudate 140 wherein the coextrudate 140 has the copolymer and/or terpolymer 10 facing the paper 120. The co-extrudate 140 is applied to the paper surface 120 between the backing roll 50 and the chill roll 60. This creates a poly coated paper 170 with one layer of copolymer or terpolymer and one layer of polyethylene monomer.

Figure 4:
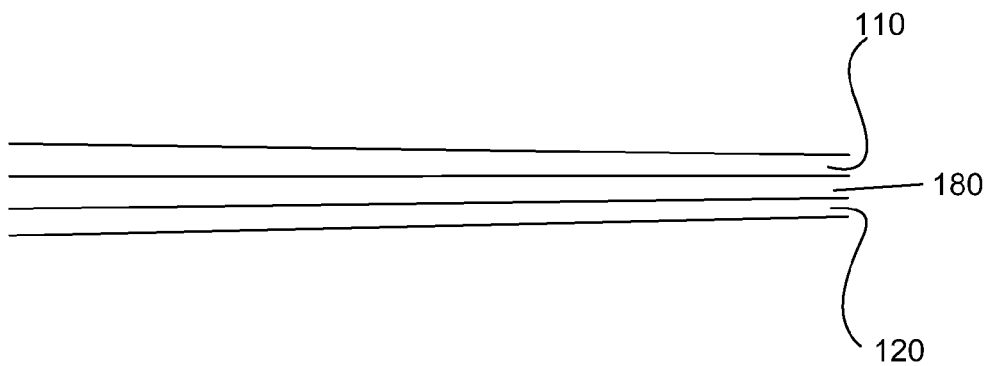
FIG. 4 illustrates the product formed by the process of FIG. 3.

FIG. 4 shows the product made by the process shown in FIG. 3 wherein the co-extruded poly coated paper 170 has one layer of copolymer or terpolymer 180 on top of the paper 120 and one layer of polyethylene monomer 110 on top of layer 180.

Figure 5:
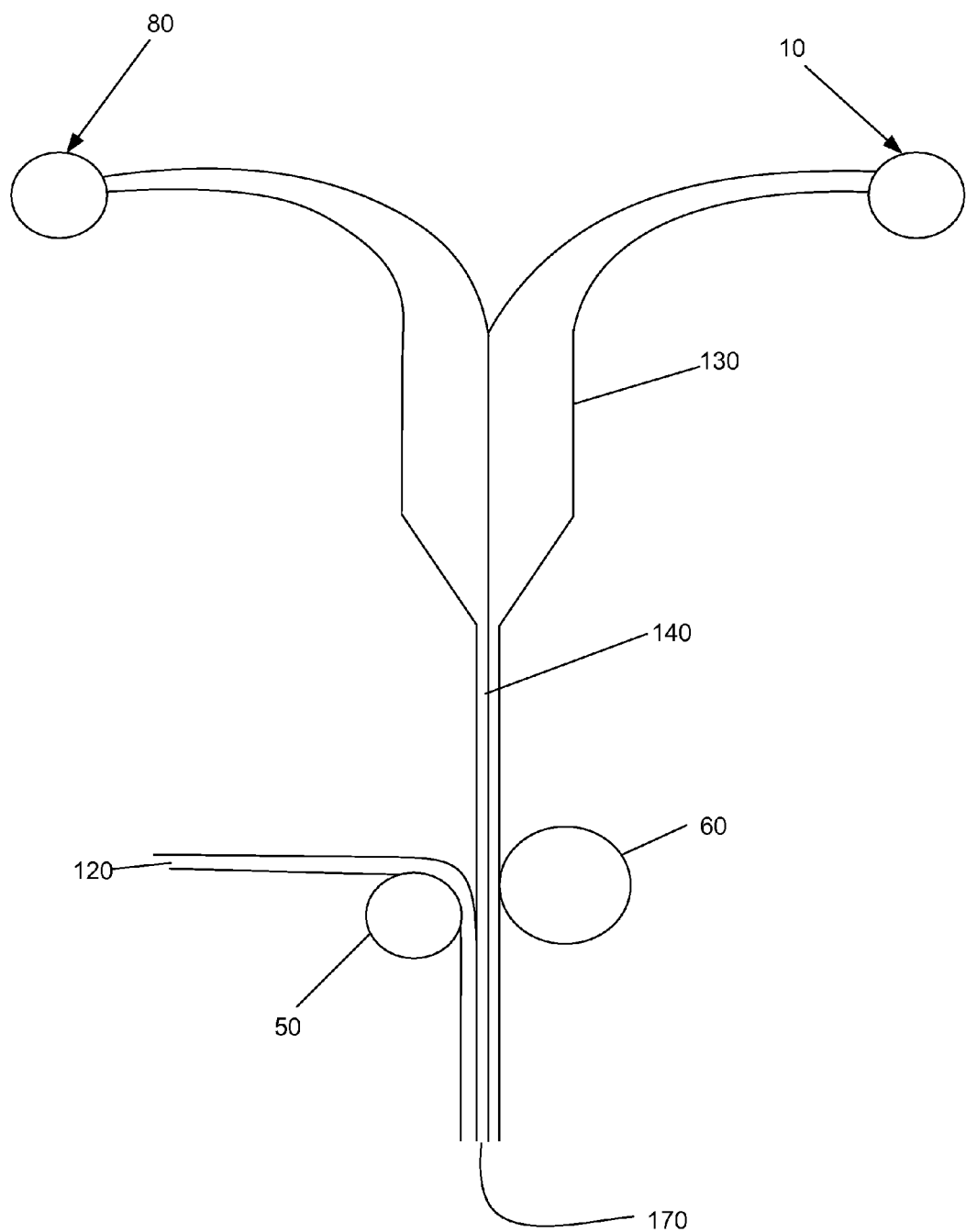
FIG. 5 illustrates a process for forming a coextruded poly coated paper with one layer of copolymer or terpolymer and one layer of polyethylene monomer.

In FIG. 5 the copolymer and/or terpolymer layer 10 which may be blended with a polyethylene monomer, is coextruded with a polyethylene monomer layer 80. The copolymer and/or terpolymer layer 10 and the polyethylene monomer layer 80 are fed through a coextruder die 130 to form coextrudate 140 wherein the coextrudate 140 has the polyethylene monomer 80 facing the paper 120. The co-extrudate 140 is applied to the paper surface 120 between the backing roll 50 and the chill roll 60. This creates a poly coated paper 170 with one layer of copolymer or terpolymer and one layer of polyethylene monomer.

Figure 6:
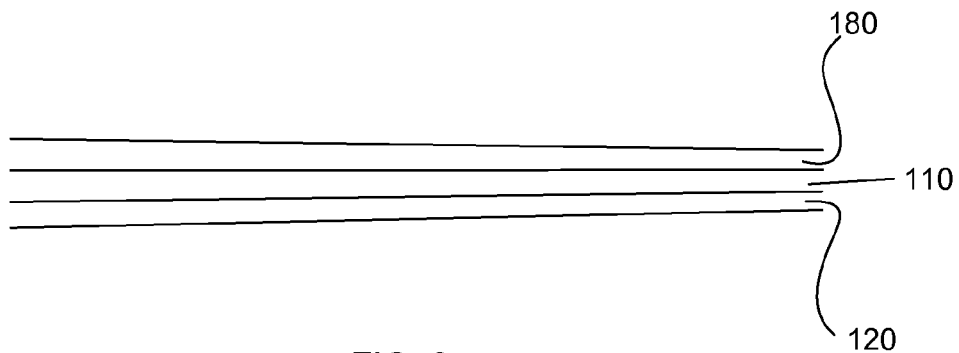
FIG. 6 illustrates the product formed by the process of FIG. 5.

FIG. 6 shows product made by the process shown in FIG. 5 wherein the co-extruded poly coated paper 170 has one layer of polyethylene monomer 110 on top of paper layer 120 and layer 180 on top of layer 110.

Figure 7:
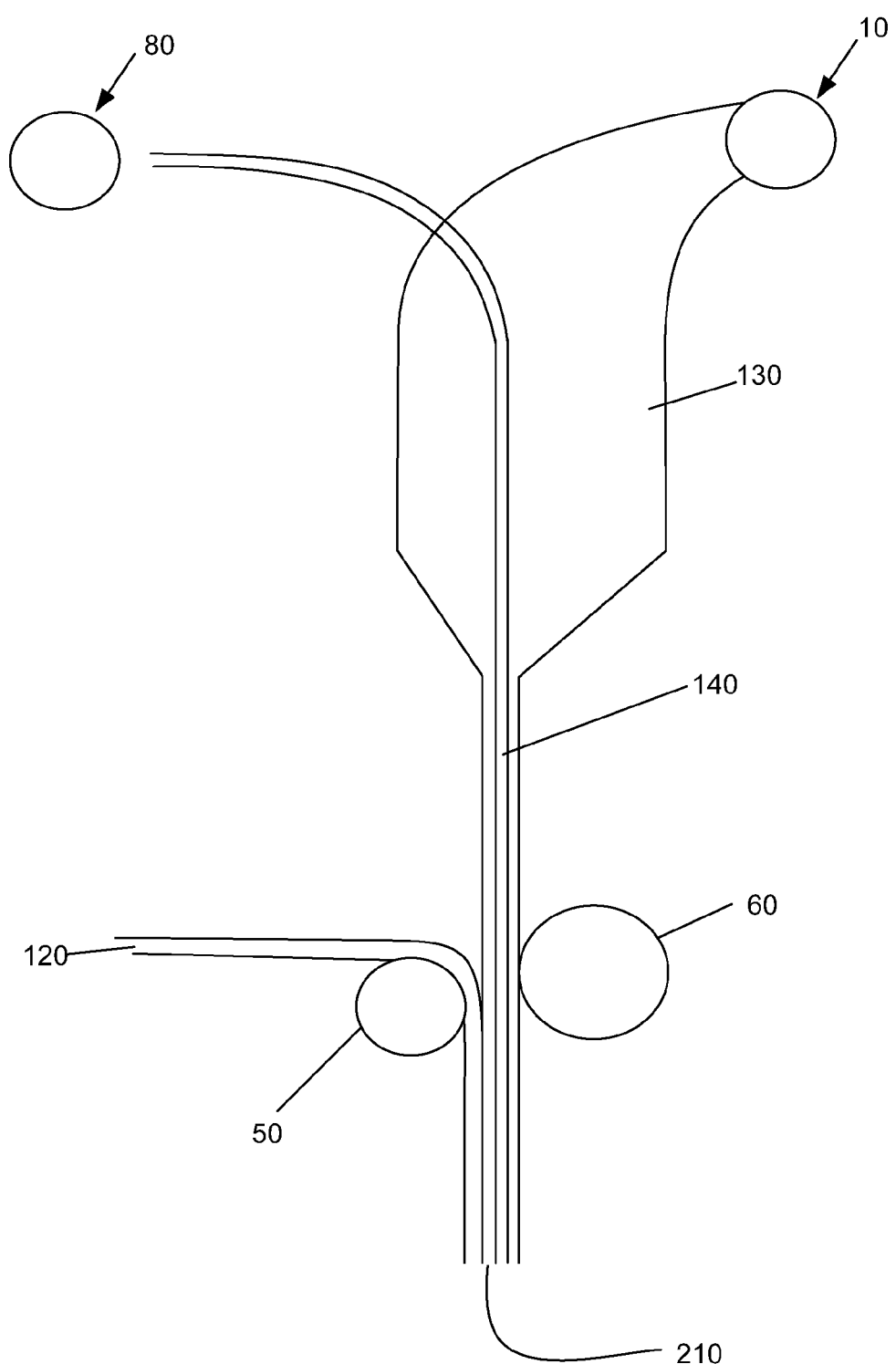
FIG. 7 illustrates a process for forming a coextruded poly coated paper with one layer of copolymer or terpolymer between two layers of polyethylene monomer.

In FIG. 7 the copolymer and/or terpolymer layer 10 which may be blended with polyethylene monomer, is coextruded with a layer of polyethylene monomer 80 on each side. The copolymer and/or terpolymer layer 10 and the polyethylene monomer layers 80 are fed through a coextruder die 130 to form coextrudate 140 wherein the coextrudate 140 has one of the polyethylene monomer layers 80 facing the paper 120. The co-extrudate 140 is applied to the paper surface 120 between the backing roll 50 and the chill roll 60. This creates a poly coated paper 210 with one layer of copolymer or terpolymer between two layers of polyethylene monomer.

Figure 8:
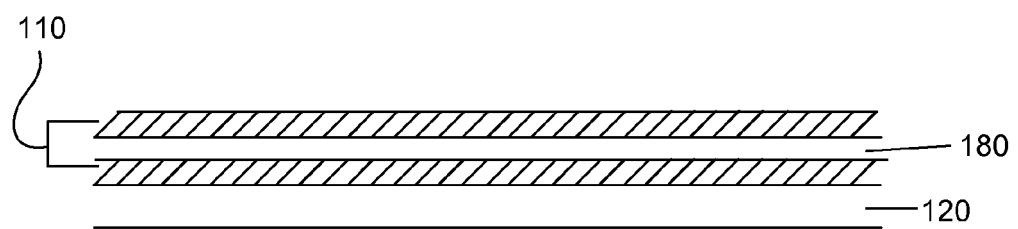
FIG. 8 illustrates the product formed by the process of FIG. 7.

FIG. 8 shows the product made by the process shown in FIG. 7 wherein the co-extruded poly coated paper 120 has one layer of polyethylene monomer 110 on top of paper layer 120 followed by layer 180 having on top of it a second layer 110.

Figure 9:
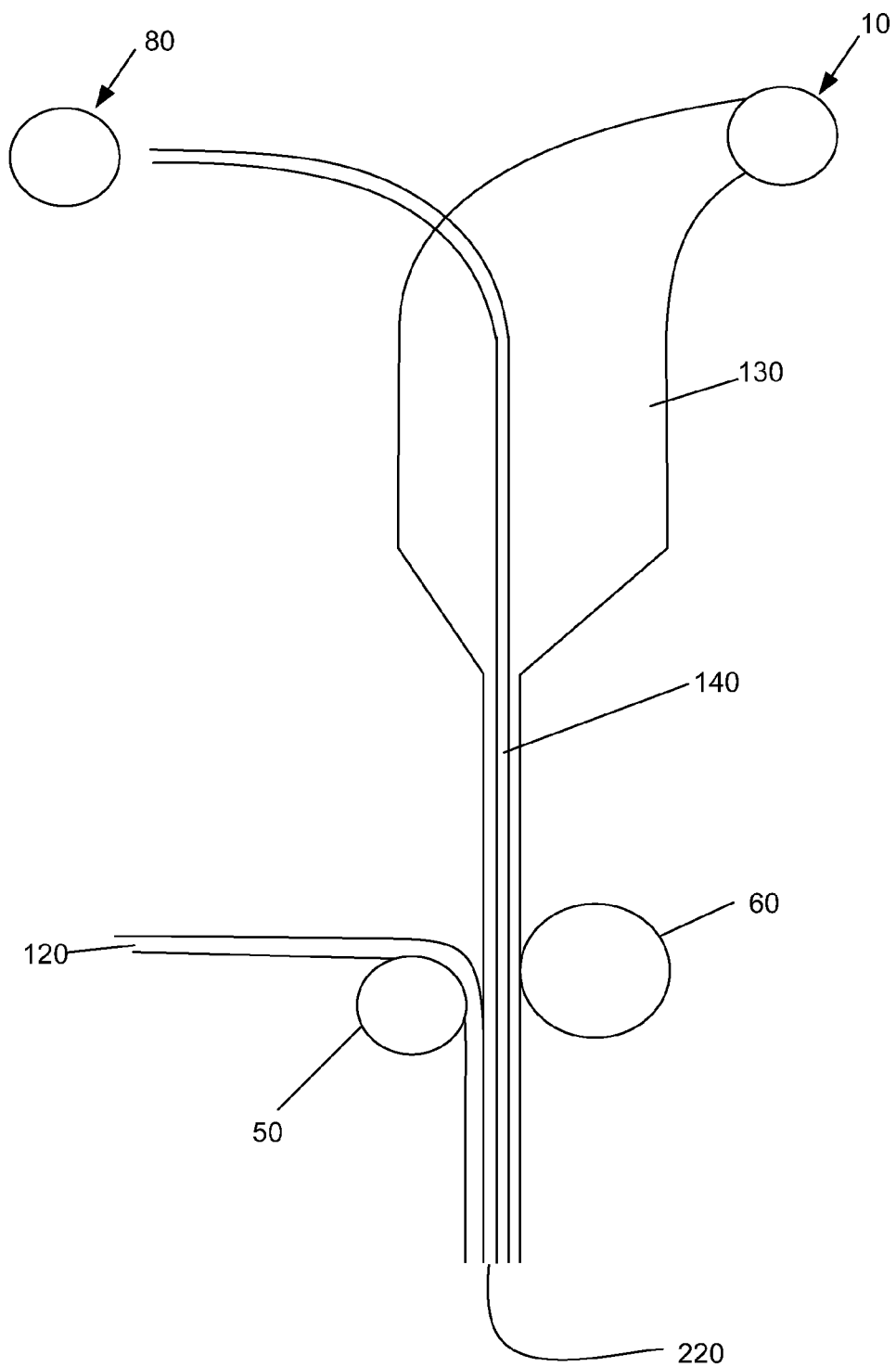
FIG. 9 illustrates a process for forming a co-extruded poly coated paper with one layer of polyethylene monomer between two layers of copolymer and/or terpolymer resin.

In FIG. 9 the copolymer and/or terpolymer layer 10 which may be blended with polyethylene monomer, is coextruded with a layer of polyethylene monomer 80 on each side. The copolymer and/or terpolymer layer 10 and the polyethylene monomer layers 80 are fed through a coextruder die 130 to form coextrudate 140 wherein the coextrudate 140 has one of the polyethylene monomer layers 80 facing the paper 120. The co-extrudate 140 is applied to the paper surface 120 between the backing roll 50 and the chill roll 60. This creates a poly coated paper 220 with one layer of copolymer or terpolymer between two layers of polyethylene monomer.

Figure 10:
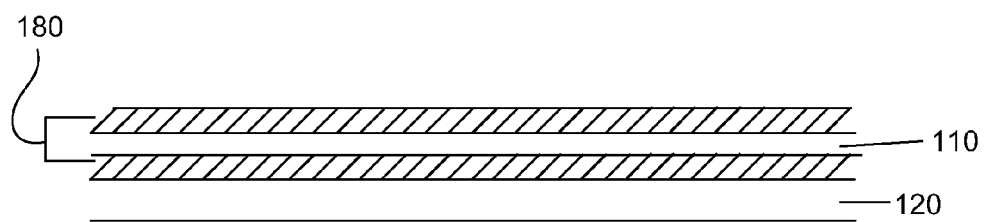
FIG. 10 illustrates the product formed by the process of FIG. 9.

FIG. 10 shows the product made by the process shown in FIG. 9 wherein the co-extruded poly coated paper 120 has one layer of polyethylene monomer 110 on top of paper layer 120 followed by layer 180 having on top of it a second layer 110.

By utilizing these copolymer and/or terpolymer resins the present invention achieves a substantial improvement in the tear strength of the ream wrapper. Below are results using the same 50# Canfor paper as above and 14 pounds of combined copolymer or terpolymer resin and low density polyethylene monomer which shows the significant strength gain versus the traditional low density polyethylene shown above.

|  | Machine Direction Tear | Cross Direction Tear |
|---|---|---|
| 50# Canfor Paper | 122 | 137 |
| 50# Canfor Paper with 14# copolymer and/or terpolymer resin or a blend of low density polyethylene monomer resin and copolymer or terpolymer resin or a coextrusion of low density monomer polyethylene resin and copolymer and/or terpolymer resin | 196 | 240 |
| Strength Gain | 70 | 103 |

MD Tear test-TAPPI T-414-units grams of force
CD Tear test-TAPPI T-414-units grams of force

The invention claimed is:

1. A one-side ream wrapper consisting of paper and copolymer and/or terpolymer resins; said copolymer and/or terpolymer resins consisting of butene, hexene, and/or octene with ethylene in feed stocks; said copolymer and/or terpolymer resins being applied to a surface of said paper; said paper and said copolymer and/or terpolymer resins forming a ream wrapper.

* * * * *